US009794332B2

(12) United States Patent
Iyengar et al.

(10) Patent No.: US 9,794,332 B2
(45) Date of Patent: *Oct. 17, 2017

(54) METHOD AND APPARATUS FOR LOAD BALANCING IN NETWORK BASED TELEPHONY APPLICATION

(71) Applicant: International Business Machines Corporation, Armonk, NY (US)

(72) Inventors: Arun Kwangil Iyengar, Yorktown Heights, NY (US); Hongbo Jiang, Cleveland, OH (US); Erich M. Nahum, New York, NY (US); Wolfgang Segmuller, Valhalla, NY (US); Asser Nasreldin Tantawi, Somers, NY (US); Charles P. Wright, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/733,171

(22) Filed: Jun. 8, 2015

(65) Prior Publication Data
US 2015/0271260 A1    Sep. 24, 2015

Related U.S. Application Data

(63) Continuation of application No. 12/110,802, filed on Apr. 28, 2008, now Pat. No. 9,071,608.

(51) Int. Cl.
*G06F 9/50* (2006.01)
*H04L 29/08* (2006.01)
(Continued)

(52) U.S. Cl.
CPC .......... *H04L 67/1008* (2013.01); *G06F 9/505* (2013.01); *H04L 47/125* (2013.01);
(Continued)

(58) Field of Classification Search
CPC ...................................................... G06F 9/505
(Continued)

(56) References Cited

U.S. PATENT DOCUMENTS 5,937,428 A  *  8/1999  Jantz ................... G06F 3/061
                                                           710/37
6,351,775 B1     2/2002  Yu
(Continued)

OTHER PUBLICATIONS

M. Aron et al., "TCP Implementation Enhancements for Improving Webserver Performance," Technical Report TR99-335, Rice University Computer Science Dept., Jul. 1999, 12 pages.
(Continued)

*Primary Examiner* — Jacob A Petranek
(74) *Attorney, Agent, or Firm* — Rabin Bhattacharya; Ryan, Mason & Lewis, LLP

(57) ABSTRACT

Techniques are disclosed for load balancing in networks such as those networks handling telephony applications. By way of example, such techniques direct requests associated with calls to servers in a system comprised of a network routing calls between a plurality of callers and at least one receiver wherein a load balancer sends requests associated with calls to a plurality of servers as follows. A request associated with a call, a caller, or a receiver is received, depending on the particular load balancing technique. A server is selected to receive the request. A subsequent request is received. A determination is made whether or not the subsequent request is associated with the call, the caller, or the receiver, depending on the particular load balancing technique. The subsequent request is sent to the server based on determining that the subsequent request is associated with the call, the caller, or the receiver, again depending on the particular load balancing technique.

11 Claims, 10 Drawing Sheets

(51) Int. Cl.
H04L 29/06 (2006.01)
H04L 12/803 (2013.01)

(52) U.S. Cl.
CPC ...... H04L 65/1006 (2013.01); H04L 67/1002 (2013.01); H04L 67/1017 (2013.01); H04L 67/1027 (2013.01); H04L 67/42 (2013.01)

(58) Field of Classification Search
USPC ........................................................ 718/105
See application file for complete search history.

(56) References Cited

U.S. PATENT DOCUMENTS

| | | | | |
|---|---|---|---|---|
| 6,446,162 | B1* | 9/2002 | Korst | G06F 3/061 348/E5.008 |
| 6,748,414 | B1* | 6/2004 | Bournas | G06F 9/505 709/201 |
| 6,963,914 | B1 | 11/2005 | Breitbart et al. | |
| 7,082,122 | B2 | 7/2006 | Pan | |
| 7,412,529 | B2 | 8/2008 | Ryu | |
| 7,647,405 | B2* | 1/2010 | Bivens | G06F 9/505 709/221 |
| 2002/0049842 | A1 | 4/2002 | Huetsch et al. | |
| 2004/0088424 | A1 | 5/2004 | Park et al. | |
| 2004/0205761 | A1 | 10/2004 | Partanen | |
| 2005/0021530 | A1 | 1/2005 | Garg et al. | |
| 2005/0044127 | A1 | 2/2005 | Jaiswal et al. | |
| 2006/0036747 | A1 | 2/2006 | Galvin, Jr. et al. | |
| 2006/0090001 | A1 | 4/2006 | Collins | |
| 2007/0016907 | A1* | 1/2007 | Benedetti | G06F 9/5038 718/104 |
| 2007/0058533 | A1 | 3/2007 | Forissier et al. | |
| 2007/0136413 | A1 | 6/2007 | Ishikawa et al. | |
| 2007/0147339 | A1 | 6/2007 | Forissier et al. | |
| 2008/0021988 | A1 | 1/2008 | Abernethy et al. | |
| 2008/0063180 | A1 | 3/2008 | Barsness et al. | |
| 2008/0076381 | A1 | 3/2008 | Vilain et al. | |
| 2008/0091779 | A1 | 4/2008 | Chetuparambil et al. | |
| 2008/0101335 | A1 | 5/2008 | Badger | |
| 2008/0144609 | A1 | 6/2008 | Kim et al. | |
| 2008/0228926 | A1 | 9/2008 | Shiratzky et al. | |
| 2009/0019158 | A1 | 1/2009 | Langen et al. | |
| 2009/0254914 | A1* | 10/2009 | Sundaresan | G06F 9/505 718/103 |

OTHER PUBLICATIONS

M. Aron et al., "Scalable Content-Aware Request Distribution in Cluster-Based Network Servers," In Proceedings of the USENIX 2000 Annual Technical Conference, San Diego, CA, Jun. 2000, 15 pages.
V. Cardellini et al., "The State of the Art in Locally Distributed Web-Server Systems," ACM Computing Surveys, Jun. 2002, vol. 34, No. 2, pp. 263-311.
J. Challenger et al., "A Scalable and Highly Available System for Serving Dynamic 13 Data at Frequently Accessed Web Sites," In Proceedings of ACM/IEEE SC98, Nov. 1998, pp. 1-30.
G. Ciardo et al., "EQUILOAD: A Load Balancing Policy for Clustered Web Servers," Performance Evaluation, pp. 101-124, vol. 46, Nos. 2-3, 2001.
D. Dias et al., "A Scalable and Highly Available Web Server," In Proceedings of the 1996 IEEE Computer Conference (COMPCON), Feb. 1996, 8 pages.
F5 Introduces Intelligent Traffic Management Solution to Power Service Providers' Rollout of Multimedia Services, http://www.f5.com/news-pressevents/press/2007/20070924.html, Sep. 2007, 2 pages.
Z. Fei et al., "A Novel Server Selection Technique for Improving the Responce Time of a Replicated Services," In Proceedings of IEEE INFOCOM, 1998, 22 pages.
H. Feng et al., "PBS: A Unified Priority-Based Scheduler," In Proceedings of ACM Sigmetrics, San Diego, CA, Jun. 2007, 12 pages.
R. Fielding et al., "Hypertext Transfer Protocol—HTTP/1.1," RFC 2068, Internet Engineering Task Force, Jan. 1997, 163 pages.
G. Goldszmidt et al., "Network Dispatcher: A Connection Router for Scalable Internet Services," In Proceedings of the 7th International World Wide Web Conference, Brisbane, Australia, Apr. 1998, 14 pages.
N. Griffiths, "NMON: A Free Tool to Analyze AIX and Linux Performance," http://www.ibm.com/developerworks/aix/library/au-analyze_aix/index.html, 2003, 10 pages.
M. Harchol-Balter et al., "On Choosing a Task Assignment Policy for a Distributed Server System," Journal of Parallel and Distributed Computing, 1999, pp. 204-228, vol. 59, No. 2.
IBM, "Application Switching with Nortel Networks Layer 2-7 Gigabit Ethernet Switch Module for IBM BladeCenter," http://www.redbooks.ibm.com/abstracts/redp3589.html?Open, Mar. 2006, 156 pages.
A. Iyengar et al., "High-Performance Web Site Design Techniques," IEEE Internet Computing, Mar./Apr. 2000, vol. 4, No. 2, pp. 17-26.
T. Kwan et al., "NCSA's World Wide Web server: Design and Performance," IEEE Computer, Nov. 1995, vol. 28, No. 11, pp. 68-74.
D. Mosedale et al., "Lessons Learned Administering Netscape's Internet Site," IEEE Internet Computing, Mar./Apr. 1997, vol. 1, No. 2, pp. 28-35.
Nortel Networks, "Layer 2-7 GbE Switch Module for IBM BladeCenter Products," http://www132.ibm.com/webapp/wcs/stores/servlet/ProductDisplay?productId=4611686018425170446&storeId=1&langId=-1&catalogId=-840, Nov. 2004, 110 pages.
B. Schroeder et al., "Evaluation of Task Assignment Policies for Supercomputing Servers: The Case for Load Unbalancing and Fairness," Cluster Computing, 2004, vol. 7, No. 2, pp. 151-161.
L. Zhang et al., "RSVP: A New Resource Reservation Protocol," IEEE Communications Magazine, May 2002, vol. 40, No. 5, pp. 116-127.
M. Ohta., "Overload Protection in a SIP Signaling Network," IEEE, Aug. 2006, 6 pages.
V.S. Pai et al., "Locality-Aware Request Distribution in Cluster-Based Network Servers," In Architectural Support for Programming Languages and Operating Systems, 1998, pp. 1-11.
J. Rosenberg et al., "SIP: Session Initiation Protocol," RFC 3261, Internet Engineering Task Force, Jun. 2002. http://www.ietf.org/rfc/rfc3261.txt, pp. 1-269.
H. Schulzrinne et al., "RTP: A Transport Protocol for Realtime Applications," RFC 3550, Internet Engineering Task Force, http://www.ietf.org/rfc/rfc3550.txt, Jul. 2003, pp. 1-89.
K. Singh et al., "Failover and Load Sharing in SIP Telephony," In Proceedings of the 2005 International Symposium on Performance Evaluation of Computer and Telecommunication Systems (SPECTS'05), http://www1.cs.columbia.edu/~kns10/publication/sipload.pdf, Jul. 2005, 11 pages.
J. Rosenberg et al., "An Offer/Answer Model with the Session Description Protocol (SDP)," RFC 3264, Standards Track, Jun. 2002, pp. 1-25.
HTTP—Hypertext Transfer Protocol, W3C, Architecture Domain, http://www.w3.org/Protocols/, 2006, pp. 1-5.

* cited by examiner

| REQUEST/REPLY | CALL-ID | DESTINATION | COUNTER 1 | COUNTER 2 |
|---|---|---|---|---|
| <START> | - | - | 0 | 0.5 |
| INVITE | 2-5839@9.2.79.34 | SERVER 1 | 1.75 | 0.5 |
| BYE | 2-5821@9.2.79.34 | SERVER 2 | 1.75 | 1.5 |
| INVITE | 2-5840@9.2.79.34 | SERVER 2 | 1.75 | 3.25 |
| 200 OK(INV) | 2-5840@9.2.79.34 | CLIENT | 1.75 | 1.5 |
| 200 OK(BYE) | 2-5821@9.2.79.34 | CLIENT | 1.75 | 0.5 |
| ... | ... | ... | ... | ... | ue
METHOD AND APPARATUS FOR LOAD BALANCING IN NETWORK BASED TELEPHONY APPLICATION

CROSS REFERENCE TO RELATED APPLICATIONS

This application is a Continuation of U.S. patent application Ser. No. 12/110,802, filed on Apr. 28, 2008, the disclosure of which is incorporated herein by reference.

This application is related to U.S. patent application Ser. No. 12/110,813, filed on Apr. 28, 2008, the disclosure of which is incorporated herein by reference.

FIELD OF THE INVENTION

The present invention relates to telephony applications in distributed communication networks and, more particularly, to techniques for load balancing in such applications and networks.

BACKGROUND OF THE INVENTION

The Session Initiation Protocol (SIP) is a general-purpose signaling protocol used to control media sessions of all kinds, such as voice, video, instant messaging, and presence. SIP is a protocol of growing importance, with uses in Voice over Internet Protocol (VoIP), Instant Messaging (IM), IP Television (IPTV), Voice Conferencing, and Video Conferencing. Wireless providers are standardizing on SIP as the basis for the IP Multimedia System (IMS) standard for the Third Generation Partnership Project (3GPP). Third-party VoIP providers use SIP (e.g., Vonage), as do digital voice offerings from existing legacy Telcos (e.g., AT&T, Verizon) as well as their cable competitors (e.g., Comcast, Time-Warner).

While individual servers may be able to support hundreds or even thousands of users, large-scale Internet Service Providers (ISPs) need to support customers in the millions. A central component to providing any large-scale service is the ability to scale that service with increasing load and customer demands. A frequent mechanism to scale a service is to use some form of a load-balancing dispatcher that distributes requests across a cluster of servers.

However, almost all research in this space has been in the context of either the Web (e.g., HyperText Transfer Protocol or HTTP) or file service (e.g., Network File Service or NFS). Hence, there is a need for new methods for load balancing techniques which are well suited to SIP and other Internet telephony protocols.

SUMMARY OF THE INVENTION

Principles of the invention provide techniques for load balancing in networks such as those networks handling telephony applications.

By way of example, in a first embodiment, a method for directing requests associated with calls to servers in a system comprised of a network routing calls between at least one caller and at least one receiver wherein a load balancer sends requests associated with calls to a plurality of servers comprises the following steps. A request associated with a call is received. A server is selected to receive the request based on one of loads and response times of the plurality of servers. A subsequent request is received. A determination is made whether or not the subsequent request is associated with the call. The subsequent request is sent to the server based on determining that the subsequent request is associated with the call.

By way of example, in a second embodiment, a method for directing requests associated with calls to servers in a system comprised of a network routing calls between a plurality of callers and at least one receiver wherein a load balancer sends requests associated with calls to a plurality of servers comprises the following steps. A request associated with a caller is received. A server is selected to receive the request. A subsequent request is received. A determination is made whether or not the subsequent request is associated with the caller. The subsequent request is sent to the server based on determining that the subsequent request is associated with the caller.

By way of example, in a third embodiment, a method for directing requests associated with calls to servers in a system comprised of a network routing calls between at least one caller and a plurality of receivers wherein a load balancer sends requests associated with calls to a plurality of servers comprises the following steps. A request associated with a receiver is received. A server is selected to receive the request based on one of loads and response times of the plurality of servers. A subsequent request is received. A determination is made whether or not the subsequent request is associated with the receiver. The subsequent request is sent to the server based on determining that the subsequent request is associated with the receiver.

These and other objects, features and advantages of the present invention will become apparent from the following detailed description of illustrative embodiments thereof, which is to be read in connection with the accompanying drawings.

DETAILED DESCRIPTION

Figure 1:
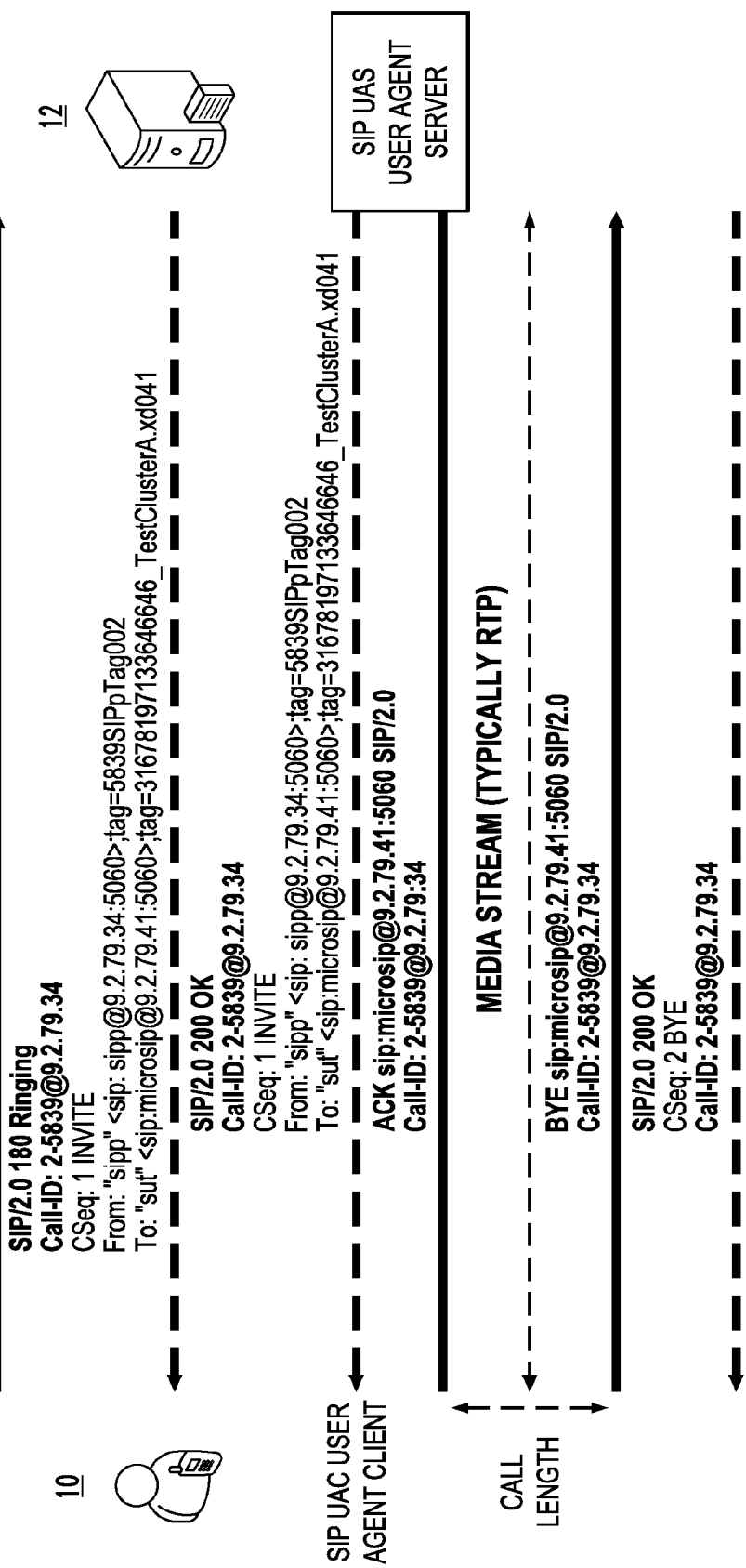
FIG. 1 illustrates an example of how the SIP protocol may be used.

While illustrative embodiments of the invention are described below in the context of the Session Initiation Protocol (SIP) and the HyperText Transfer Protocol (HTTP), it is to be understood that principles of the invention are not so limited. That is, principles of the invention are applicable to a broad range of protocols which could be used for telephony applications.

SIP is a transaction-based protocol designed to establish and tear down media sessions, frequently referred to as calls. Two types of state exist in SIP. The first, session state, is created by the INVITE transaction and is destroyed by the BYE transaction. Each SIP transaction also creates state that exists for the duration of that transaction. SIP thus has overheads (e.g., central processing unit and/or memory requirements) that are associated both with sessions and transactions, and leveraging this fact can result in more optimized SIP load balancing.

The fact that SIP is session-oriented has important implications for load balancing. Transactions corresponding to the same session should be routed to the same server in order for the system to efficiently access state corresponding to the session. Session-Aware Request Assignment (SARA) is the process by which a system assigns requests to servers in a manner so that sessions are properly recognized by the system and requests corresponding to the same session are assigned to the same server.

Another key aspect of the SIP protocol is that different transaction types, most notably the INVITE and BYE transactions, can incur significantly different overheads; INVITE transactions are about 75 percent more expensive than BYE transactions on certain illustrative systems. The load balancer can make use of this information to make better load balancing decisions which improve both response time and request throughput. In accordance with the invention, we demonstrate how the SARA process can be combined with estimates of relative overhead for different requests to improve load balancing.

In accordance with illustrative principles of the invention, and as will be described below in detail, we propose the following new load balancing algorithms that can be used for load balancing in the presence of SIP. They combine the notion of Session-Aware Request Assignment (SARA), dynamic estimates of server load (in terms of occupancy), and knowledge of the SIP protocol. Three such algorithms (with additional inventive algorithms to be further described herein) are generally described as follows:

Call-Join-Shortest-Queue (CJSQ) tracks the number of calls allocated to each back-end node and routes new SIP calls to the node with the least number of active calls.

Transaction-Join-Shortest-Queue (TJSQ) routes a new call to the server that has the fewest active transactions rather than the fewest calls. This algorithm improves on CJSQ by recognizing that calls in SIP are composed of the two transactions, INVITE and BYE, and that by tracking their completion separately, finer-grained estimates of server load can be maintained. This leads to better load balancing, particularly since calls have variable length and thus do not have a unit cost.

Transaction-Least-Work-Left (TLWL) routes a new call to the server that has the least work, where work (i.e., load) is based on estimates of the ratio of transaction costs. TLWL takes advantage of the observation that INVITE transactions are more expensive than BYE transactions. We have found that a 1.75:1 cost ratio between INVITE and BYE results in the best performance. For different systems, this ratio may be different.

SIP is a control-plane protocol designed to establish, alter, and terminate media sessions between two or more parties. For example, as generally illustrated in FIG. 1, SIP messages are exchanged between a User Agent Client 10 and a User Agent Server 12. The core Internet Engineering Task Force (IETF) SIP specification is given in RFC 3261 ("SIP: Session Initiation Protocol," Rosenberg et. al, IEFT RFC 3261, the disclosure of which is incorporated by reference herein). Several kinds of sessions can be used, including voice, text, and video, which are transported over a separate data-plane protocol. This separation of the data plane from the control plane is one of the key features of SIP and contributes to its flexibility. SIP was designed with extensibility in mind; for example, the SIP protocol requires that proxies forward and preserve headers that they do not understand.

As other examples, SIP can run over many protocols such as User Datagram Protocol (UDP), Transmission Control Protocol (TCP), Secure Sockets Layer (SSL), Stream Control Transmission Protocol (SCTP), Internet Protocol version 4 (IPv4) and Internet Protocol version 6 (IPv6). SIP does not allocate and manage network bandwidth as does a network resource reservation protocol such as RSVP; that is considered outside the scope of the protocol. SIP is a text-based protocol that derives much of its syntax from HTTP (http://www.w3.org/Protocols/). Messages contain headers and, additionally bodies, depending on the type of message.

For example, in Voice over IP (VoIP), SIP messages contain an additional protocol, the Session Description Protocol (SDP) ("An Offer/Answer Model with the Session Description Protocol (SDP)", Rosenberg, Schulzrinne, IETF RFC 3264, the disclosure of which is incorporated by reference herein), which negotiates session parameters (e.g., which voice codec to use) between end points using an offer/answer model. Once the end hosts agree to the session characteristics, the Real-time Transport Protocol (RTP) is typically used to carry voice data ("RTP: A Transport Protocol for Real-Time Applications", Schulzrinne et al, IETF RFC 3550, the disclosure of which is incorporated by reference herein). After session setup, endpoints usually send media packets directly to each other in a peer-to-peer fashion, although this can be complex if network middleboxes such as Network Address Translation (NAT) or firewalls are present.

A SIP Uniform Resource Identifier (URI) uniquely identifies a SIP user, e.g., sip:hongbo@us.ibm.com. This layer of indirection enables features such as location-independence and mobility.

SIP users employ end points known as user agents. These entities initiate and receive sessions. They can be either hardware (e.g., cell phones, pagers, hard VoIP phones) or software (e.g., media mixers, IM clients, soft phones). User agents are further decomposed into User Agent Clients (UAC) and User Agent Servers (UAS), depending on whether they act as a client in a transaction (UAC) or a server (UAS). Most call flows for SIP messages thus display how the UAC and UAS behave for that situation.

SIP uses HTTP-like request/response transactions. A transaction is composed of a request to perform a particular method (e.g., INVITE, BYE, CANCEL, etc.) and at least one response to that request. Responses may be provisional, namely, that they provide some short term feedback to the user (e.g., TRYING, RINGING) to indicate progress, or they can be final (e.g., OK, 407 UNAUTHORIZED). The transaction is completed when a final response is received, but not with only a provisional response.

SIP is composed of four layers, which define how the protocol is conceptually and functionally designed, but not necessarily implemented. The bottom layer is called the syntax/encoding layer, which defines message construction. This layer sits above the IP transport layer, e.g., UDP or TCP. SIP syntax is specified using an augmented Backus-Naur Form grammar (ABNF). The next layer is called the transport layer. This layer determines how a SIP client sends requests and handles responses, and how a server receives requests and sends responses. The third layer is called the transaction layer. This layer matches responses to requests, manages SIP application-layer timeouts, and retransmissions. The fourth layer is called the transaction user (TU) layer, which may be thought of as the application layer in SIP. The TU creates an instance of a client request transaction and passes it to the transaction layer.

A dialog is a relationship in SIP between two user agents that lasts for some time period. Dialogs assist in message sequencing and routing between user agents, and provide context in which to interpret messages. For example, an INVITE message not only creates a transaction (the sequence of messages for completing the INVITE), but also a dialog if the transactions completes successfully. A BYE message creates a new transaction and, when the transaction completes, ends the dialog. In a VoIP example, a dialog is a phone call, which is delineated by the INVITE and BYE transactions.

An example of a SIP message is as follows:
INVITE sip:voicemail@us.ibm.com SIP/2.0
Via: SIP/2.0/UDP sip-proxy.us.ibm.com:5060; branch=z9hG4bK74bf9
Max-Forwards: 70
From: Hongbo<sip:hongbo@us.ibm.com>;tag=9fxced76s1
To: VoiceMail Server<sip:voicemail@us.ibm.com>
Call-ID: 38482762982201885111 @hongbo-thinkpad.watson.ibm.com
CSeq: 1 INVITE
Contact: <sip:hongbo@hongbo-thinkpad.watson.ibm.com; transport=udp>
Content-Type: application/sdp
Content-Length: 151
v=0
o=hongbo 2890844526 2890844526 IN IP4 hongbo-thinkpad.watson.ibm.com
s=–
c=IN IP4 9.2.2.101
t=0 0
m=audio 49172 RTP/AVP 0
a=rtpmap:0 PCMU/8000

In this message, the user hongbo@us.ibm.com is contacting the voicemail server to check his voicemail. This message is the initial INVITE request to establish a media session with the voicemail server. An important line to notice is the Call-ID: header, which is a globally unique identifier for the session that is to be created. Subsequent SIP messages must refer to that Call-ID to look up the established session state. If the voicemail server is provided by a cluster, the initial INVITE request will be routed to one back-end node, which will create the session state. Barring some form of distributed shared memory in the cluster, subsequent packets for that session must also be routed to the same back-end node, otherwise the packet will be erroneously rejected. Thus, a SIP load balancer could use the Call-ID in order to route a message to the proper node.

Given the above description of features of SIP, we now present the design and implementation of a load balancer for SIP in accordance with illustrative embodiments of the invention.

Figure 2:
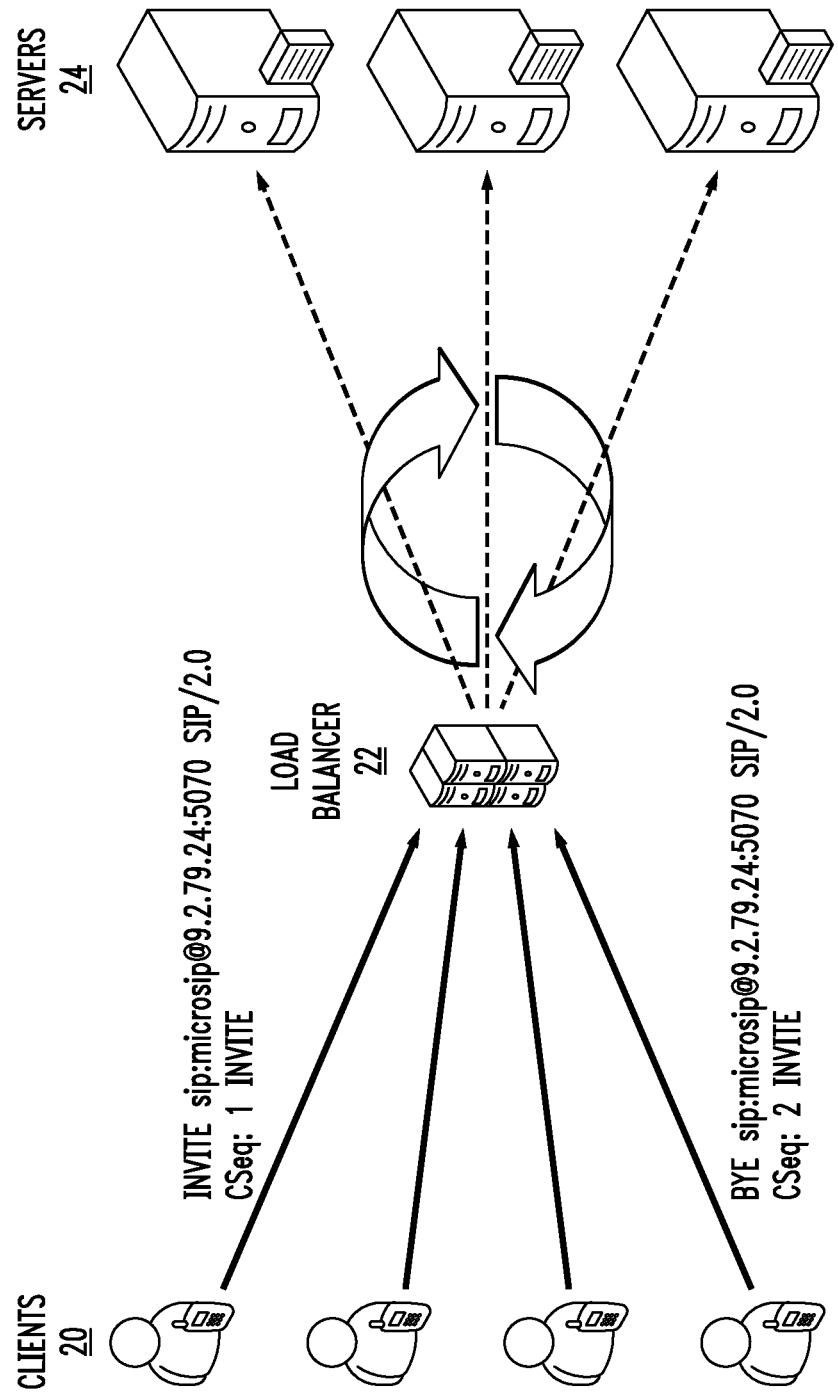
FIG. 2 depicts a scalable system for handling calls in accordance with an embodiment of the present invention.

FIG. 2 depicts a scalable system for handling calls in accordance with an embodiment of the present invention. Requests from SIP User Agent Clients 20 are sent to load balancer 22 which then selects a SIP server from among a cluster of servers 24 to handle each request. The various load balancing algorithms presented herein according to principles of the invention use different methods for picking SIP servers to handle requests. Servers send responses to SIP requests (such as 180 TRYING or 200 OK) to the load balancer which then sends each response to the client.

A key aspect of our load balancer is that it implements Session-Aware Request Assignment (SARA) so that requests corresponding to the same session (call) are routed to the same server. The load balancer has the freedom to pick a server to handle the first request of a call. All subsequent requests corresponding to the call go to the same server. This allows all requests corresponding to the same session to efficiently access state corresponding to the session. SARA is important for SIP and is usually not implemented in HTTP load balancers.

The three load balancing algorithms, CJSQ, TJSQ, and TLWL, are based on assigning calls to servers by picking the server with the (estimated) least amount of work assigned but not yet completed.

In our system, the load balancer can estimate the work assigned to a server based on the requests it has assigned to the server and the responses it has received from the server. Responses from servers to clients first go through the load balancer which forwards the responses to the appropriate clients. By monitoring these responses, the load balancer can determine when a server has finished processing a request or call and update the estimates it is maintaining for the work assigned to the server.

The Call-Join-Shortest-Queue (CJSQ) algorithm estimates the amount of work a server has left to do based on the number of calls (sessions) assigned to the server. Counters may be maintained by the load balancer indicating the number of calls assigned to a server. When a new INVITE request is received (which corresponds to a new call), the request is assigned to the server with the lowest counter, and the counter for the server is incremented by one. When the load balancer receives an OK response to the BYE corresponding to the call, it knows that the server has finished processing the call and decrements the counter for the server.

It is to be appreciated that the number of calls assigned to a server is not always an accurate measure of the load on a server. There may be long idle periods between the transactions in a call. In addition, different calls may be composed of different numbers of transactions and may consume different amounts of server resources. An advantage of CJSQ is that it can be used in environments in which the load balancer is aware of the calls assigned to servers but does not have an accurate estimate of the transactions assigned to servers.

An alternative method is to estimate server load based on the transactions (requests) assigned to the servers. The Transaction-Join-Shortest-Queue (TJSQ) algorithm estimates the amount of work a server has left to do based on the number of transactions (requests) assigned to the server. Counters are maintained by the load balancer indicating the number of transactions assigned to each server. When a new INVITE request is received (which corresponds to a new call), the request is assigned to the server with the lowest counter, and the counter for the server is incremented by one. When the load balancer receives a request corresponding to an existing call, the request is sent to the server handling the call, and the counter for the server is incremented. When the load balancer receives an OK response for a transaction, it knows that the server has finished processing the transaction and decrements the counter for the server.

It is to be appreciated that, in the TJSQ approach, transactions are weighted equally. There are many situations in which some transactions are more expensive than others, and this should ideally be taken into account in making load balancing decisions. In the SIP protocol, INVITE requests consume more overhead than BYE requests.

Figure 11:
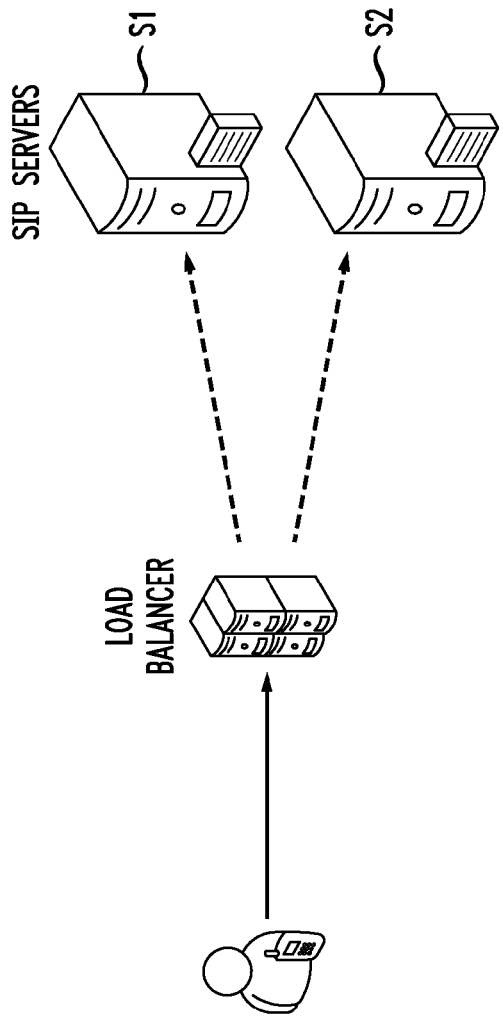
FIG. 11 depicts the use of the TLWL load balancing algorithm in accordance with an embodiment of the present invention.

The Transaction-Least-Work-Left (TLWL) algorithm addresses this issue by assigning different weights to different transactions depending on their expected overhead. It is similar to TJSQ with the enhancement that transactions are weighted by overhead; in the special case that all transactions have the same expected overhead, TLWL and TJSQ are the same. Counters are maintained by the load balancer indicating the weighted number of transactions assigned to each server. New calls are assigned to the server with the lowest counter. Our SIP implementation of TLWL achieves near optimal performance with a weight of one for BYE transactions and about 1.75 for INVITE transactions. This weight can be varied within the spirit and scope of the invention. Different systems may have different optimal values for the weight. FIG. 11 presents a simple example of how TLWL can be used to balance load (via a load balancer configured in accordance with principles of the invention) in a system with two servers (S1 and S2). In practice, it scales well to a much larger number of servers.

The presentation of the load balancing algorithms so far assumes that the servers have similar processing capacities. In some situations, the servers may have different processing capabilities. Some servers may be more powerful than others. One server might have all of its resources available for handling SIP requests from the load balancer, while another server might only have a fraction of its resources available for such requests. In these situations, the load balancer should assign a new call to the server with the lowest value of estimated work left to do (as determined by the counters) divided by the capacity of the server; this applies to CJSQ, TJSQ, and TLWL.

A simpler form of TJSQ could be deployed for applications in which SARA is not needed. For example, consider a Web-based system communicating over HTTP. The load balancer would have the flexibility to assign requests to servers without regard for sessions. It would maintain information about the number of requests assigned to each server. The key support that the load balancer would need from the server would be a notification of when a request has completed. In systems for which all responses from the server first go back to the load balancer which then forwards the responses to the client, a response from the server would serve as the desired notification, so no further support from the server would be needed.

This system could further be adapted to a version of TLWL without SARA if the load balancer is a content-aware layer 7 switch. In this case, the load balancer has the ability to examine the request and also receives responses from the server; no additional server support would be required for the load balancer to keep track of the number of requests assigned to each server. Based on the contents of the request, the load balancer could assign relative weights to the requests. For example, a request for a dynamic page requiring invocation of a server program could be assigned a higher weight than a request for a file. The load balancer could use its knowledge of the application to assign different weights to different requests.

Another method is to make load balancing decisions based on server response times. The Response-time Weighted Moving Average (RWMA) algorithm assigns calls to the server with the lowest weighted moving average response time of the last n (20 in our illustrative implementation) response time samples. The formula for computing the RWMA linearly weights the measurements so that the load balancer is responsive to dynamically changing loads, but does not overreact if the most recent response time measurement is highly anomalous. The most recent sample has a weight of n, the second most recent a weight of n−1, and the oldest a weight of one. The load balancer determines the response time for a request based on the time when the request is forwarded to the server and the time the load balancer receives a 200 OK reply from the server for the request.

We have also implemented a couple of simple load balancing algorithms which do not require the load balancer to estimate server load, response times, or work remaining to be done.

The hash algorithm is a static approach for assigning calls to servers based on Call-ID which is a string contained in the header of a SIP message identifying the call to which the message belongs. A new INVITE transaction with Call-ID x is assigned to server (Hash(x) mod N), where Hash(x) is a hash function and N is the number of servers. We have used both a hash function provided by OpenSer and FNV hash. OpenSer refers to the open SIP express router (http://www.openser.org) and FNV hash refers to Landon Curt Noll, Fowler/noll/vo (fnv) (http://isthe.com/chongo/tech/comp/fnv/).

The hash algorithm is not guaranteed to assign the same number of calls to each server. The Round Robin (RR) algorithm guarantees a more equal distribution of calls to servers. If the previous call was assigned to server M, the next call is assigned to server (M+1) mod N, where N is again the number of servers in the cluster.

To summarize the previous discussion, we have proposed several session-aware request assignment (SARA) algorithms including but not limited to:

Hash. Given a Call-ID x, the node assigned is (Hash(x) mod N), where N is the number of nodes. Note this algorithm is completely static.

Round Robin (RR). This algorithm tracks where the last session assignment was made. Given that the previous assignment was made to node M, the next session is assigned to node (M+1) mod N, where N is again the number of nodes in the cluster.

Response-time Weighted Moving Average (RWMA). This algorithm tracks the average response time for each back-end node and allocates sessions to the node with the smallest estimate of response time.

Call-Join-Shortest-Queue (CSJQ). This algorithm tracks call assignment to each node by tracking requests. When a new INVITE arrives, the request is assigned to the node with the fewest calls. The counter for that node is increased by one, and is decremented only when the OK response to the BYE is seen.

Transaction-Join-Shortest-Queue (TSJQ). This algorithm tracks transaction assignment to each node. When a new INVITE arrives, the request is assigned to the node with the fewest transactions. Transaction counts are incremented when the request arrives (INVITE, BYE) and decremented when that transaction completes (the appropriate OK for that transaction is seen). Transactions are assumed to have the same weight, except for ACK, which has no weight.

Transaction-Least-Work-Left (TLWL). This algorithm is similar to TJSQ above, except that rather than each transaction having the same weight, INVITE transactions have a higher weight than BYE transactions. In one preferred embodiment, an invite request has a weight of around 1.75 BYE transactions; the weight can be varied within the spirit and scope of the invention. When a new INVITE arrives, the session is assigned to a node with a lowest total sum of weights corresponding to requests assigned but not completed by the node. A variant of this algorithm could assign INVITE transactions a weight of 2 BYE transactions, rather than 1.75. Yet another variant of this algorithm could assign INVITE transactions a weight of 1.5 BYE transactions. Here we distinguish the weights for INVITE and BYE since we observe that the INVITE request poses more work to the server than the BYE.

Below is the pseudocode for a main loop of a load balancer in accordance with an embodiment of the present invention:

h=hash call-id
look up session in active table

```
if not found
    /* don't know this session */}
    if INVITE
        /* new session */
        select one node d using algorithm
        (TLWL, TJSQ, RR, Hash, etc)
        add entry (s,d,ts) to active table
        s = STATUS_INV
        node_counter[d] += w_inv
        /* non-invites omitted for clarity */
    else /* this is an existing session */
        if 200 response for INVITE
            s = STATUS_INV_200
            record response time for INVITE
            node_counter[d] -= w_inv
        else if ACK request
            s = STATUS_ACK
        else if BYE request
            s = STATUS_BYE
            node_counter[d] += w_bye
        else if 200 response for BYE
            s = STATUS_BYE_200
            record response time for BYE
            node_counter[d] -= w_bye
            move entry to expired table
        /* end session lookup check */
        if request (INVITE, BYE etc.)
            forward to d
        else if response (200/100/180/481)
            forward to client
```

Figure 8:
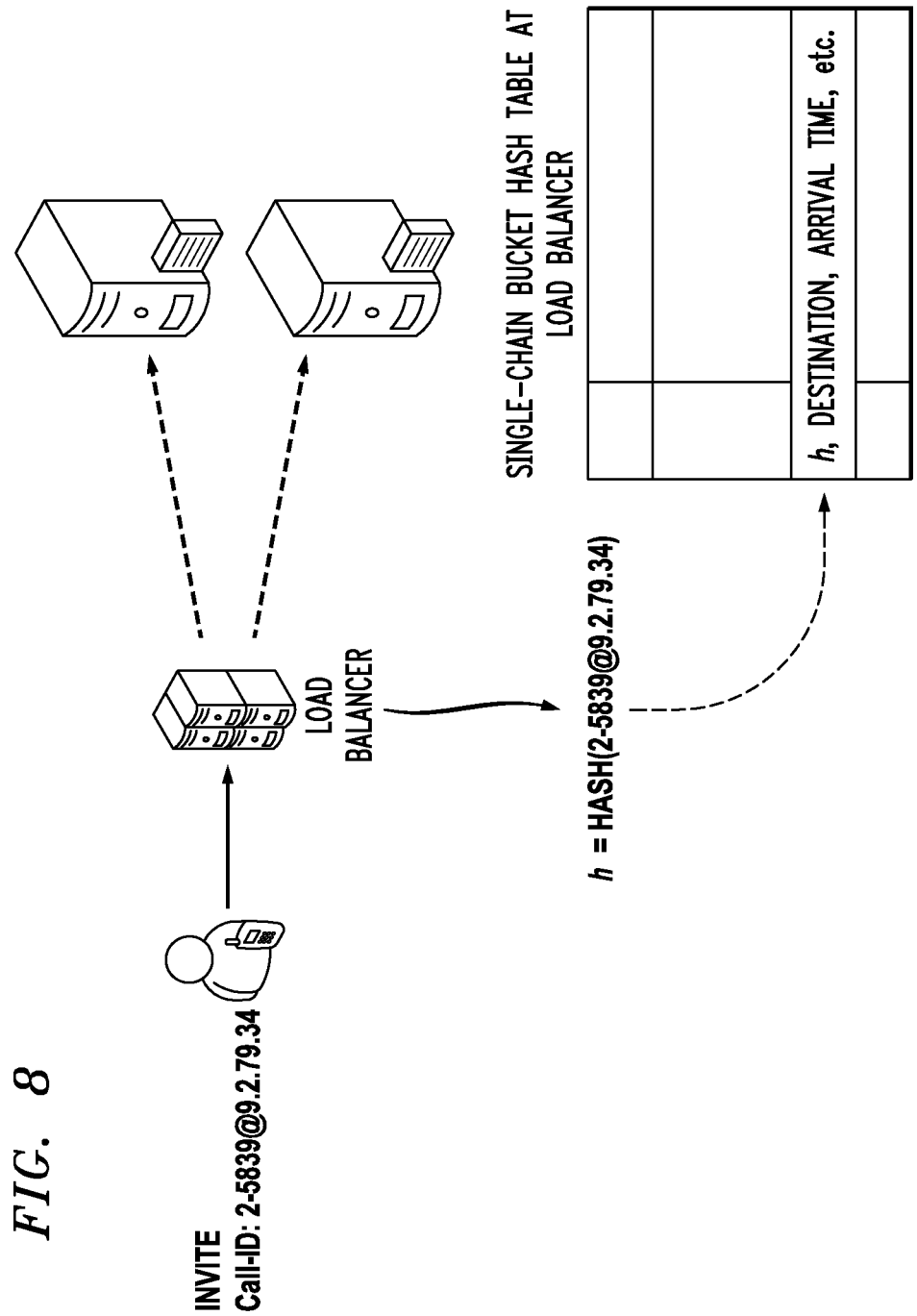
FIGS. 8-10 show how session affinity can be maintained using a hash table in accordance with an embodiment of the present invention.
Figure 9:
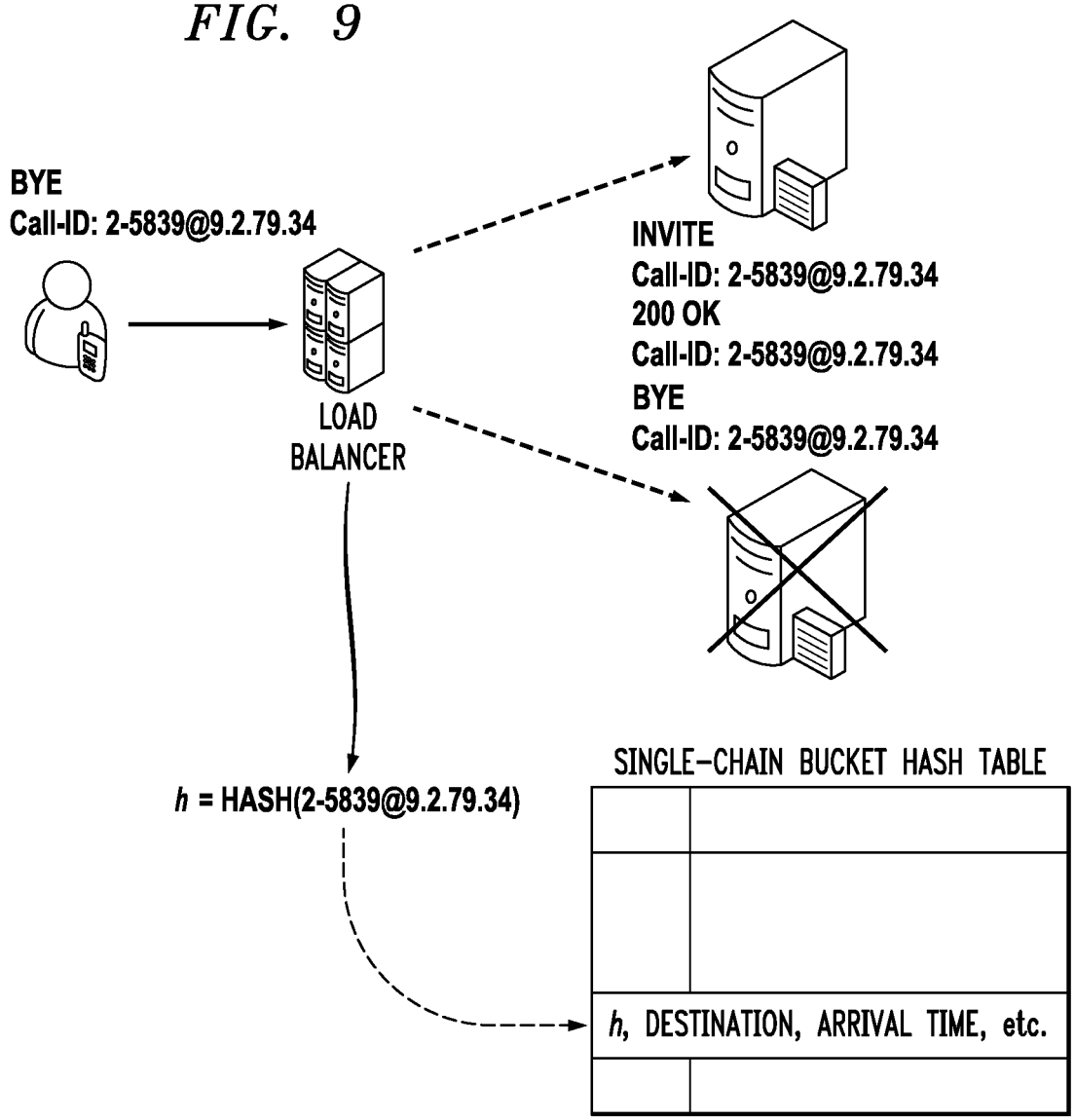
Figure 10:
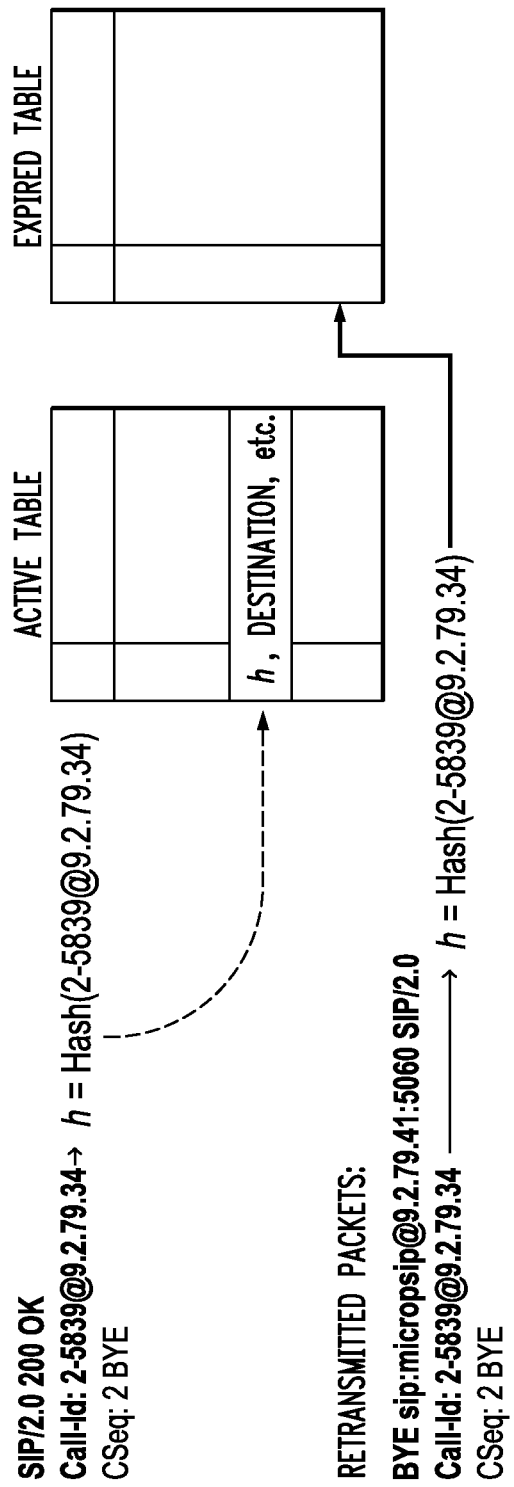

The pseudocode is intended to convey the general approach of the load balancer; it omits certain corner cases and error handling (for example, for duplicate packets). The essential approach is to identify SIP packets by their Call-ID and use that as a hash key for table lookup in a chained bucket hash table, as illustrated in FIGS. 8-10. Two hash tables are maintained: an active table that maintains active sessions and transactions, and an expired table which is used for routing stray duplicate packets for requests that have already completed. This is analogous to the handling of old duplicate packets in TCP when the protocol state machine is in the TIME-WAIT state. When sessions are completed, their state is moved into the expired hash table. Expired sessions eventually time out and are garbage collected.

Below is the pseudocode for a garbage collector in accordance with an embodiment of the invention:
T_1 threshold|
ts0: current time|
for(each entry) in expired hash table
    if ts0−ts>T_1
        remove the entry Our load balancer selects the appropriate server to handle the first request of a call. It also maintains mappings between calls and servers using two hash tables which are indexed by call ID. The active hash table maintains call information on calls the system is currently handling. After the load balancer receives a 200 status message from a server in response to a BYE message from a client, the load balancer moves the call information from the active hash table to the expired hash table so that the call information is around long enough for the client to receive the 200 status message that the BYE request has been processed by the server. Information in the expired hash table is periodically reclaimed by garbage collection. Both hash tables store multiple entities which hash to the same bucket in a linked list.

The hash table information for a call identifies which server is handling requests for the call. That way, when a new transaction corresponding to the call is received, it will be routed to the correct server.

Part of the state of the SIP machine is effectively maintained using a status variable; this helps identify retransmissions. When a new INVITE request arrives, a new node is assigned, depending on the algorithm used. BYE and ACK requests are sent to the same machine where the original INVITE was assigned to. For algorithms that use response time, the response time of the individual INVITE and BYE requests are recorded when they are completed. An array of node counter values is kept that tracks occupancy of INVITE and BYE requests, according to weight; the weight values are described in the particular algorithm below.

We found that the choice of hash function affects the efficiency of the load balancer. The hash function used by OpenSER did not do a very good job of distributing call IDs across hash buckets. Given a sample test with 300,000 calls, OpenSER's hash function only spread the calls to about 88,000 distinct buckets. This resulted in a high percentage of buckets containing several call ID records; searching these buckets adds overhead.

We experimented with several different hash functions and found FNV hash (Landon Curt Noll, "Fowler/Noll/Vo (FNV) Hash") to be a preferred one. For that same test of 300,000 calls, FNV Hash mapped these calls to about 228,000 distinct buckets. The average length of searches was thus reduced by a factor of almost three.

Figure 3:
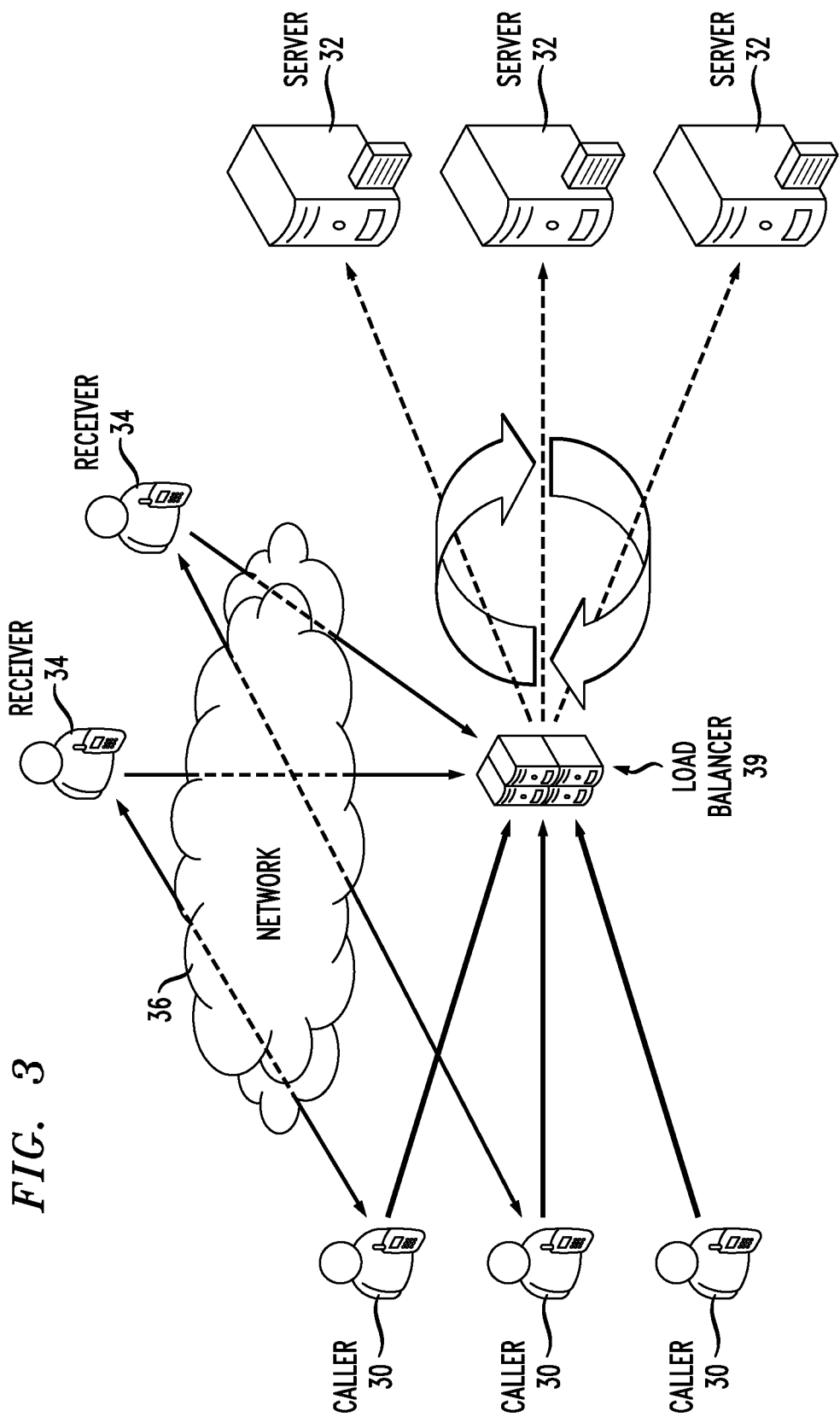
FIG. 3 depicts a scalable system for handling calls in accordance with an embodiment of the present invention.

FIG. 3 shows a system in which features according to the invention may be implemented (i.e., the above-described load balancing algorithms). The figure shows a plurality of callers 30 and receivers 34. A "receiver" refers to an entity or device receiving a call from the "caller" (calling entity or device). If a protocol such as SIP is being used, both callers 30 and receivers 34 can function as clients or user agent clients (UAC). In some cases, such as if SIP is being used as a communication protocol, the load balancer 39 may receive responses from servers 32 which it forwards to callers 30 and/or receivers 34.

Figure 4:
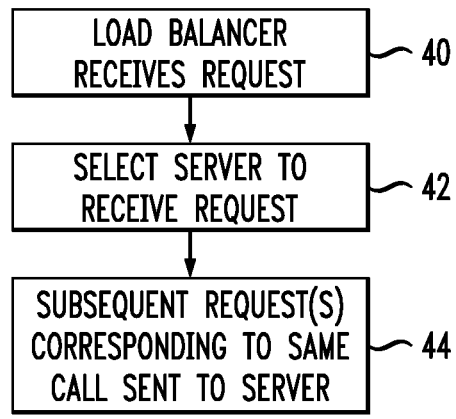
FIG. 4 depicts a method for load balancing requests to servers based on calls in accordance with an embodiment of the present invention.

FIG. 4 shows a method for handling request traffic for a protocol such as SIP, in accordance with an embodiment of the invention, when it is desirable to route requests corresponding to a same call to a same server. The system maintains mappings between calls and servers via one or more hash tables mapping call IDs to server IDs as described above. In step 40, a load balancer 39 receives a request associated with a call. In step 42, a hash table is consulted to determine if there already is a server associated with the call ID. If so, processing proceeds to step 44 wherein the request is routed to the server corresponding to the call ID. If not, the system determines an appropriate server to handle the request as well as subsequent ones corresponding to the same call. Several methods can be used to select the server including but not limited to the TLWL, TJSQ, CSJQ, RWMA, RR, and hash methods described above.

The server could be selected based on estimated loads of back-end servers. If the servers all have similar request handling capacity, it is preferable to pick the least loaded server or one of the least loaded servers. There are several ways to estimate load on the back-end servers. The TLWL, TSJQ, CSJQ, and RWMA algorithms use different methods for estimating load on back-end servers. TLWL estimates an aggregate amount of work assigned to servers based on requests which have not completed. RWMA estimates response times of servers in order to pick a server to receive the request. One method for selecting a server is to pick a server with a lowest response time or lowest estimated response time.

In some cases, the servers will not have the same processing power. For example, one server s1 might have a considerably more powerful central processing unit (CPU) than another server s2. In another scenario, even though s1 and s2 might have similar CPU capacity, 30% of the processing power for s1 might be devoted to another application, while for s2, all of the processing power is dedicated to handling Internet telephony requests. In either case, we can take these factors into consideration in making load balancing decisions. For example, we can define the capacity of a server as the amount of resources (e.g. CPU resources; the capacity of the server could be equal to or proportional to CPU capacity) the server can devote to the Internet telephony application. Capacity will be higher for a more powerful server. It will also be higher for a server which has a greater percentage of its resources dedicated to handling Internet telephony requests.

Using this approach, the load or estimated load on a server can be divided by the capacity of the server in order to determine the weighted load for the server. A server with a least weighted load can be selected in step 42 instead of a server with a least load. If load is estimated based on an amount of work left to do, then the amount of work left to do (which is typically estimated and may not be exact) can be divided by the capacity of the server in order to determine the weighted work left. A server with a least weighted work left to do can be selected in step 42 instead of a server with a least work left to do.

CJSQ, TSJQ, and TLWL are examples of algorithms which select a server based on an estimated least work left to do by the server. CJSQ estimates work left to do by the number of calls assigned to a server. A call can include multiple requests. TSJQ estimates work left to do based on the number of requests assigned to a server. TLWL takes into account the fact that different requests have different overheads. It estimates the amount of work a server has left to do based on the number of requests assigned to the server weighted by the relative overheads of the requests. INVITE requests consume more resources than BYE requests. Therefore, TLWL weights INVITE requests more heavily than BYE requests (a factor of 1.75 for the ratio of INVITE to BYE overheads is a reasonable choice).

After the server has been selected, the request is sent to the selected server. In addition, the load balancer needs to maintain state information so that subsequent requests corresponding to the call will be routed to the right server in step 44. One way of doing this is to store the mapping between the call ID and server ID in a hash table(s), as described above.

Figure 5:
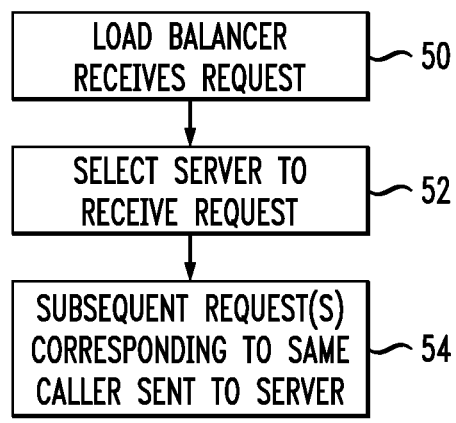
FIG. 5 depicts a method for load balancing requests to servers based on callers in accordance with an embodiment of the present invention.

In other situations, it may be desirable to route requests from the same caller to the same server. FIG. 5 shows a preferred method for doing this. The system maintains mappings between callers and servers via one or more hash tables mapping caller IDs to server IDs as described above. In step 50, a load balancer 39 receives a request associated with a caller 30. In step 52, a hash table is consulted to determine if there already is a server associated with the caller ID. If so, processing proceeds to step 54 wherein the request is routed to the server corresponding to the caller ID. If not, the system determines an appropriate server to handle the request as well as subsequent ones corresponding to the same caller. Several methods can be used to select the server including but not limited to the TLWL, TJSQ, RWMA, RR, and hash methods described above.

The server could be selected based on estimated loads of back-end servers. If the servers all have similar request handling capacity, it is preferable to pick the least loaded server or one of the least loaded servers. There are several ways to estimate load on the back-end servers. The TLWL, TSJQ, and RWMA algorithms use different methods for estimating load on back-end servers. TLWL estimates an aggregate amount of work assigned to servers based on requests which have not completed. RWMA estimates response times of servers in order to pick a server to receive the request. One method for selecting a server is to pick a server with a lowest response time or lowest estimated response time.

In some cases, the servers will not have the same processing power. For example, one server s1 might have a considerably more powerful central processing unit (CPU) than another server s2. In another scenario, even though s1 and s2 might have similar CPU capacity, 30% of the processing power for s1 might be devoted to another application, while for s2, all of the processing power is dedicated to handling Internet telephony requests. In either case, we can take these factors into consideration in making load balancing decisions. For example, we can define the capacity of a server as the amount of resources (e.g. CPU resources; the capacity of the server could be equal to or proportional to CPU capacity) the server can devote to the Internet telephony application. Capacity will be higher for a more powerful server. It will also be higher for a server which has a greater percentage of its resources dedicated to handling Internet telephony requests.

Using this approach, the load or estimated load on a server can be divided by the capacity of the server in order to determine the weighted load for the server. A server with a least weighted load can be selected in step 52 instead of a server with a least load. If load is estimated based on an amount of work left to do, then the amount of work left to do (which is typically estimated and may not be exact) can be divided by the capacity of the server in order to determine the weighted work left. A server with a least weighted work left to do can be selected in step 52 instead of a server with a least work left to do.

TSJQ and TLWL are examples of algorithms which select a server based on an estimated least work left to do by the server. TSJQ estimates work left to do based on the number of requests assigned to a server. TLWL takes into account the fact that different requests have different overheads. It estimates the amount of work a server has left to do based on the number of requests assigned to the server weighted by the relative overheads of the requests. INVITE requests consume more resources than BYE requests. Therefore, TLWL weights INVITE requests more heavily than BYE requests (a factor of 1.75 for the ratio of INVITE to BYE overheads is a reasonable choice).

A variant of CJSQ can be used in step 52. Caller-Join-Shortest-Queue, CJSQ, tracks the number of callers assigned to servers. When a request corresponding to a new caller is received, the request is sent to a server with a least number of callers assigned to it.

After the server has been selected, the request is sent to the selected server. In addition, the load balancer needs to maintain state information so that subsequent requests corresponding to the caller will be routed to the correct server in step 54. One way of doing this is to store the mapping between the caller ID and server ID in a hash table(s), as described above.

Figure 6:
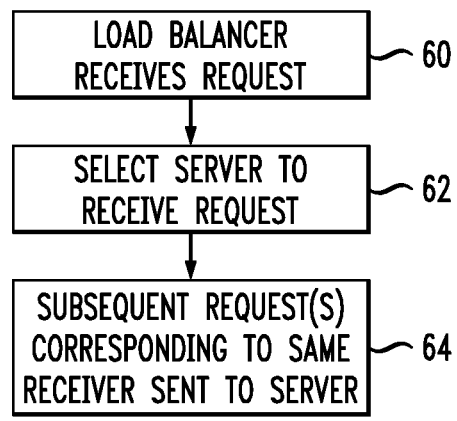
FIG. 6 depicts a method for load balancing requests to servers based on receivers in accordance with an embodiment of the present invention.

In yet other situations, it may be desirable to route requests from the same receiver to the same server. FIG. 6 shows a preferred method for doing this. The system maintains mappings between receivers and servers via one or more hash tables mapping receiver IDs to server IDs as described above. In step 60, a load balancer 39 receives a request associated with a receiver 34. In step 62, a hash table is consulted to determine if there already is a server associated with the receiver ID. If so, processing proceeds to step 64 wherein the request is routed to the server corresponding to the receiver ID. If not, the system needs to determine an appropriate server to handle the request as well as subsequent ones corresponding to the same receiver. Several methods can be used to select the server including but not limited to the TLWL, TJSQ, RWMA, RR, and hash methods described above.

The server could be selected based on estimated loads of back-end servers. If the servers all have similar request handling capacity, it is preferable to pick the least loaded server or one of the least loaded servers. There are several ways to estimate load on the back-end servers. The TLWL, TSJQ, and RWMA algorithms use different methods for estimating load on back-end servers. TLWL estimates an aggregate amount of work assigned to servers based on requests which have not completed. RWMA estimates response times of servers in order to pick a server to receive the request. One method for selecting a server is to pick a server with a lowest response time or lowest estimated response time.

In some cases, the servers will not have the same processing power. For example, one server s1 might have a considerably more powerful central processing unit (CPU) than another server s2. In another scenario, even though s1 and s2 might have similar CPU capacity, 30% of the processing power for s1 might be devoted to another application, while for s2, all of the processing power is dedicated to handling Internet telephony requests. In either case, we can take these factors into consideration in making load balancing decisions. For example, we can define the capacity of a server as the amount of resources (e.g. CPU resources; the capacity of the server could be equal to or proportional to CPU capacity) the server can devote to the Internet telephony application. Capacity will be higher for a more powerful server. It will also be higher for a server which has a greater percentage of its resources dedicated to handling Internet telephony requests.

Using this approach, the load or estimated load on a server can be divided by the capacity of the server in order to determine the weighted load for the server. A server with a least weighted load can be selected in step 62 instead of a server with a least load. If load is estimated based on an amount of work left to do, then the amount of work left to do (which is typically estimated and may not be exact) can be divided by the capacity of the server in order to determine the weighted work left. A server with a least weighted work left to do can be selected in step 62 instead of a server with a least work left to do.

TSJQ, and TLWL are examples of algorithms which select a server based on an estimated least work left to do by the server. TSJQ estimates work left to do based on the number of requests assigned to a server. TLWL takes into account the fact that different requests have different overheads. It estimates the amount of work a server has left to do based on the number of requests assigned to the server weighted by the relative overheads of the requests. INVITE requests consume more resources than BYE requests. Therefore, TLWL weights INVITE requests more heavily than BYE requests (a factor of 1.75 for the ratio of INVITE to BYE overheads is a reasonable choice).

A variant of CJSQ can be used in step 62. Receiver-Join-Shortest-Queue, RJSQ, tracks the number of receivers assigned to servers. When a request corresponding to a new receiver is received, the request is sent to a server with a least number of receivers assigned to it.

After the server has been selected, the request is sent to the selected server. In addition, the load balancer maintains state information so that subsequent requests corresponding to the receiver will be routed to the right server in step 64. One way of doing this is to store the mapping between the receiver ID and server ID in a hash table(s), as described above.

In some cases, it is desirable to associate multiple nodes, wherein a node participates in a call as a caller or receiver, with a same server. For example, the nodes might represent a group of SIP user agents, G1, who frequently communicate with each other. It may be desirable for requests associated with nodes in G1 to be sent to a same server. That way, the state corresponding to SIP requests associated with a node in G1 would be available on the same server.

In some cases, all requests received by the load balancer 39 from a node in G1 should be routed to a same server, s1. In other cases, only some of the requests received by the load balancer 39 from a node in G1 should be routed to server s1. For example, if n1 is a node in G1, it may be appropriate to route all requests associated with n1 for which n1 is a caller to s1. For a request for which n1 is a receiver, it may be possible to route the request to a server other than s1.

As another example, if n2 is another node in G1, it may be appropriate to route all requests associated with n2 for which n2 is a receiver to s1. For a request for which n2 is a caller, it may be possible to route the request to a server other than s1.

Figure 7:
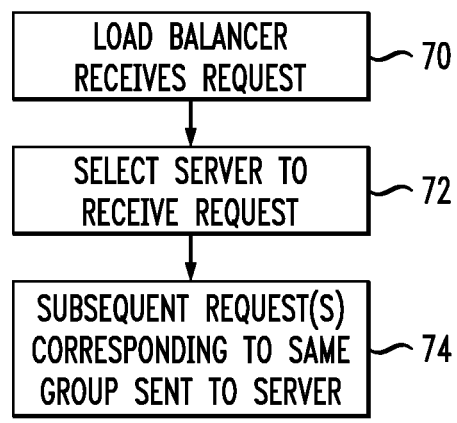
FIG. 7 depicts a method for load balancing requests to servers based on groups comprising a plurality of nodes in accordance with an embodiment of the present invention.

FIG. 7 shows a preferred method for load balancing by associating requests from multiple nodes with a server. A group comprising a plurality of nodes, wherein a node participates in a call as a caller or a receiver, is assumed to exist. This group may be defined by users of the system. Alternatively, the system could assign nodes to groups in an automated fashion.

A node in a group may have affinity attributes associated with it indicating how requests associated with the node should be mapped to a server associated with the group. For example, an affinity attribute could indicate that all requests associated with a node should be mapped to a server associated with the group. Alternatively, it could indicate that requests associated with the node should be mapped to a server associated with the group if the node is a caller. Alternatively, it could indicate that requests associated with the node should be mapped to a server associated with the group if the node is a receiver. An affinity attribute could specify several other things as well.

The system maintains mappings between groups and servers via one or more hash tables mapping group IDs to server IDs as described above. It also maintains a group directory mapping nodes to groups. In step 70, a load balancer 39 receives a request associated with a set of one or more nodes, N1. The request could correspond to distinct caller and receiver nodes, for example. In step 72, the group directory is consulted to determine which of the nodes in N1 is part of a group. If none of the nodes in N1 are part of a group, then the request may be assigned to a server without having special affinity requirements resulting from a group.

If at least one node in N1 belongs to a group G1, let us make a simplifying assumption that no node in N1 belongs to another group G2. It is straightforward to apply the method to situations in which a node in N1 belongs to another group, and principles of the invention are completely applicable to such a scenario.

It is then determined by looking at any existing affinity attributes for nodes in N1 whether any such node has a role in the request necessitating that the request be routed to a server associated with G1. If not, then the request may be assigned to a server without having special affinity requirements resulting from a group. If so, a hash table is consulted to determine if there already is a server associated with G1. If so, processing proceeds to step 74 wherein the request is routed to the server corresponding to G1. If not, the system determines an appropriate server to handle the request. Several methods can be used to select the server including but not limited to the TLWL, TJSQ, RWMA, RR, and hash methods described above.

The server could be selected based on estimated loads of back-end servers. If the servers all have similar request handling capacity, it is preferable to pick the least loaded server or one of the least loaded servers. There are several ways to estimate load on the back-end servers. The TLWL, TSJQ, and RWMA algorithms use different methods for estimating load on back-end servers. TLWL estimates an aggregate amount of work assigned to servers based on requests which have not completed. RWMA estimates response times of servers in order to pick a server to receive the request. One method for selecting a server is to pick a server with a lowest response time or lowest estimated response time.

In some cases, the servers will not have the same processing power. For example, one server s1 might have a considerably more powerful central processing unit (CPU) than another server s2. In another scenario, even though s1 and s2 might have similar CPU capacity, 30% of the processing power for s1 might be devoted to another application, while for s2, all of the processing power is dedicated to handling Internet telephony requests. In either case, we can take these factors into consideration in making load balancing decisions. For example, we can define the capacity of a server as the amount of resources (e.g. CPU resources; the capacity of the server could be equal to or proportional to CPU capacity) the server can devote to the Internet telephony application. Capacity will be higher for a more powerful server. It will also be higher for a server which has a greater percentage of its resources dedicated to handling Internet telephony requests.

Using this approach, the load or estimated load on a server can be divided by the capacity of the server in order to determine the weighted load for the server. A server with a least weighted load can be selected in step 72 instead of a server with a least load. If load is estimated based on an amount of work left to do, then the amount of work left to do (which is typically estimated and may not be exact) can be divided by the capacity of the server in order to determine the weighted work left. A server with a least weighted work left to do can be selected in step 72 instead of a server with a least work left to do.

TSJQ, and TLWL are examples of algorithms which select a server based on an estimated least work left to do by the server. TSJQ estimates work left to do based on the number of requests assigned to a server. TLWL takes into account the fact that different requests have different overheads. It estimates the amount of work a server has left to do based on the number of requests assigned to the server weighted by the relative overheads of the requests. INVITE requests consume more resources than BYE requests. Therefore, TLWL weights INVITE requests more heavily than BYE requests (a factor of 1.75 for the ratio of INVITE to BYE overheads is a reasonable choice).

A variant of CJSQ can be used in step 72. Group-Join-Shortest-Queue I, GJSQ I, tracks the number of groups assigned to servers. When a request corresponding to a new receiver is received, the request is sent to a server with a least number of groups assigned to it.

Note that not all groups are of equal size. Some groups will have more nodes than others. Thus, a variant of GJSQ I can be used in step 72. Group-Join-Shortest-Queue II, GJSQ II, tracks the sum of the number of nodes in groups assigned to servers, a quantity we refer to as SUM_NODES_IN_GROUPS. When a request corresponding to a new group is received, the request is sent to a server with a least value of SUM_NODES_IN_GROUPS.

Note that not all nodes in a group will result in the same request traffic to a server node associated with the group. Some nodes will participate in more calls than others. For some nodes, all requests associated with the node will be sent to a server associated with the group; for other nodes, only a fraction of the requests associated with the node will be sent to a server associated with the group. Thus, a variant of GJSQ II can be used in step 72. Group-Join-Shortest-Queue III, GJSQ III, tracks the sum of the number of nodes in groups assigned to a server but weights this sum by an estimated frequency with which a node is expected to make requests handled by the server. This results in a quantity we refer to as WEIGHTED_SUM_NODES_IN_GROUPS. When a request corresponding to a new group is received, the request is sent to a server with a least value of WEIGHTED_SUM_NODES_IN_GROUPS.

After the server has been selected, the request is sent to the selected server. In addition, the load balancer needs to maintain state information so that subsequent requests corresponding to the group will be routed to the right server in step 74. One way of doing this is to store the mapping between the group ID and server ID in a hash table(s), as described above.

To reiterate, as described above, FIGS. 8-10 show how session affinity can be maintained using a hash table in accordance with an embodiment of the present invention.

As depicted in FIG. 8, the load balancer will keep call state for the entire duration of the call. That is, the load balancer builds a data structure (such as a hash table, as illustrated) to record the routes of calls when receiving the first request of a call and making a routing decision based on a specific dispatch algorithm. Dictionary lookups in the data structure could be based on the call-id, the caller or the receiver of the call.

As depicted in FIG. 9, upon receiving subsequent requests corresponding to the call, the load balancer looks up the route in the data structure and then sends the request to the destination node accordingly.

When a call is terminated, the corresponding entry in the active data structure (active table) should be removed to an expired data structure (expired table). This is illustrated in FIG. 10.

To reiterate, as described above, FIG. 11 presents a simple example of how TLWL can be used to balance load (via a load balancer configured in accordance with principles of the invention) in a system with two back-end nodes (servers S1 and S2). The example, inter alia, depicts the content of the counters maintained by the load balancer.

Figure 12:
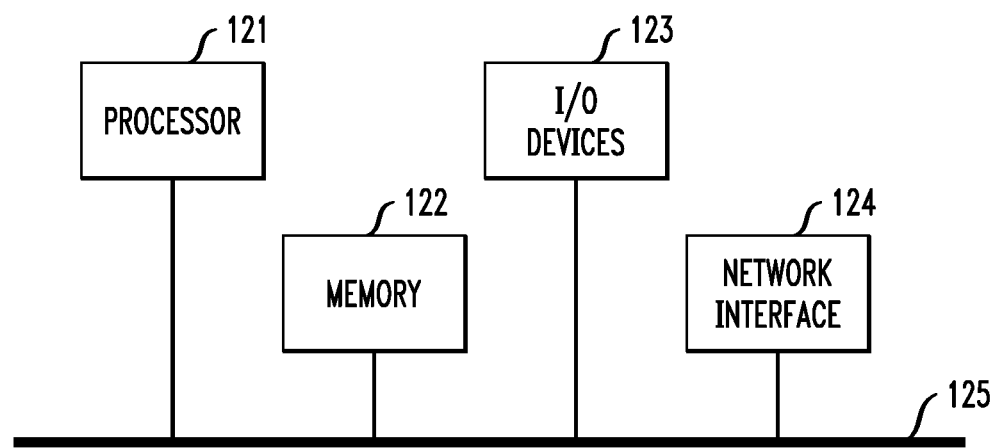
FIG. 12 shows a computer system in accordance with which one or more components/steps of the techniques of the invention may be implemented.

Lastly, FIG. 12 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 12 may represent one or more load balancers, one or more client devices, one or more servers, or one or more other processing devices capable of providing all or portions of the functions described herein.

The computer system may generally include a processor 121, memory 122, input/output (I/O) devices 123, and network interface 124, coupled via a computer bus 125 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In a system comprised of a network routing calls between at least one caller and at least one receiver using a session initiation protocol, wherein a load balancer sends requests associated with calls to servers, a method for directing requests associated with calls to said servers, the method comprising the steps of:

assigning different weights to different request types based on an overhead associated with processing requests of the different request types, wherein the different request types comprise an INVITE request and a BYE request, wherein the INVITE request is assigned a first weight, and the BYE request is assigned a second weight, wherein the first weight is higher in value than the second weight;

maintaining a counter for each of a plurality of servers, wherein the counter for a given server indicates a total count of a weighted number of requests assigned to the given server;

receiving a request associated with a call;

estimating an amount of work that each of the plurality of servers has left to do for processing calls currently assigned to the plurality of servers, wherein said amount of work that a given server of the plurality of servers has left to do is estimated based on the total count of the weighted number of requests assigned to the given server as indicated by the counter maintained for the given server;

selecting a server of the plurality of servers to receive and process the request associated with said call based on the estimated amount of work that the selected server has left to do as compared to the estimated amount of work that at least one other server of the plurality of servers has left to do;

receiving a subsequent request;

determining whether or not the subsequent request is another request associated with said call; and sending the subsequent request to said selected server based on determining that the subsequent request is another request associated with said call.

2. The method of claim 1, wherein the first weight has a value that is in a range of 1.5 to 2.0 times higher than a value of the second weight.

3. The method of claim 1, wherein selecting a server of the plurality of servers comprises selecting a server of the plurality of servers having a lowest ratio value of an estimated amount of work left to do by the server divided by a capacity of the server, wherein said capacity of the server is proportional to a central processing unit capacity.

4. An article of manufacture comprising a non-transitory computer readable storage medium storing thereon one or more programs which when executed by a computer system perform the steps of claim 1.

5. In a system comprised of a network routing calls between a plurality of callers and at least one receiver using a session initiation protocol, wherein a load balancer sends requests associated with calls to servers, a method for directing requests associated with calls to said servers, the method comprising the steps of:
   assigning different weights to different request types based on an overhead associated with processing requests of the different request types, wherein the different request types comprise an INVITE request and a BYE request, wherein the INVITE request is assigned a first weight, and the BYE request is assigned a second weight, wherein the first weight is higher in value than the second weight;
   maintaining a counter for each of a plurality of servers, wherein the counter for a given server indicates a total count of a weighted number of requests assigned to the given server;
   receiving a request associated with a caller, wherein the caller corresponds to a device or client application making a call;
   estimating an amount of work that each of the plurality of servers has left to do for processing calls currently assigned to the plurality of servers, wherein said amount of work that a given server of the plurality of servers has left to do is estimated based on the total count of the weighted number of requests assigned to the given server as indicated by the counter maintained for the given server;
   selecting a server of the plurality of servers to receive and process the request associated with said caller based on the estimated amount of work that the selected server has left to do as compared to the estimated amount of work that at least one other server of the plurality of servers has left to do;
   receiving a subsequent request that may be associated with said caller or another caller;
   determining whether or not the subsequent request is associated with said caller; and
   sending the subsequent request to said selected server based on determining that the subsequent request is associated with said caller.

6. The method of claim 5, wherein selecting a server of the plurality of servers comprises selecting a server of the plurality of servers having a lowest ratio value of an estimated amount of work left to do by the server divided by a capacity of the server, wherein said capacity of the server is proportional to a central processing unit capacity.

7. The method of claim 5, wherein the first weight has a value that is in a range of 1.5 to 2.0 times higher than a value of the second weight.

8. An article of manufacture comprising a non-transitory computer readable storage medium storing thereon one or more programs which when executed by a computer system perform the steps of claim 5.

9. In a system comprised of a network routing calls between at least one caller and a plurality of receivers using a session initiation protocol, wherein a load balancer sends requests associated with calls to servers, a method for directing requests associated with calls to said servers, the method comprising the steps of:
   assigning different weights to different request types based on an overhead associated with processing requests of the different request types, wherein the different request types comprise an INVITE request and a BYE request, wherein the INVITE request is assigned a first weight, and the BYE request is assigned a second weight, wherein the first weight is higher in value than the second weight;
   maintaining a counter for each of a plurality of servers, wherein the counter for a given server indicates a total count of a weighted number of requests assigned to the given server;
   receiving a request associated with a receiver, wherein the receiver corresponds to a device or client application receiving a call;
   estimating an amount of work that each of the plurality of servers has left to do for processing calls currently assigned to the plurality of servers, wherein said amount of work that a given server of the plurality of servers has left to do is estimated based on the total count of the weighted number of requests assigned to the given server as indicated by the counter maintained for the given server;
   selecting a server of the plurality of servers to receive and process the request associated with said receiver based on the estimated amount of work that the selected server has left to do as compared to the estimated amount of work that at least one other server of the plurality of servers has left to do;
   receiving a subsequent request that may be associated with said receiver or another receiver;
   determining whether or not the subsequent request is associated with said receiver; and
   sending the subsequent request to said selected server based on determining that the subsequent request is associated with said receiver.

10. The method of claim 9, wherein selecting a server of the plurality of servers comprises selecting a server of the plurality of servers having a lowest ratio value of an estimated amount of work left to do by the server divided by a capacity of the server, wherein said capacity of the server is proportional to a central processing unit capacity.

11. The method of claim 9, wherein the first weight has a value that is in a range of 1.5 to 2.0 times higher than a value of the second weight.

\* \* \* \* \*